United States Patent [19]

Tsuzuki

[11] Patent Number: 4,922,399
[45] Date of Patent: May 1, 1990

[54] DC-TO-DC CONVERTER HAVING IMPROVED POWER SUPPLY ARRANGEMENT

[75] Inventor: Kuniyuki Tsuzuki, Tokyo, Japan
[73] Assignee: NEC Corporation, Tokyo, Japan
[21] Appl. No.: 319,790
[22] Filed: Mar. 7, 1989

[30] Foreign Application Priority Data

Mar. 7, 1988 [JP] Japan ................... 63-53957

[51] Int. Cl.⁵ .......................................... H02M 3/335
[52] U.S. Cl. .................................. 363/21; 363/56
[58] Field of Search ............ 363/20, 21, 49, 56, 363/97; 323/901

[56] References Cited

U.S. PATENT DOCUMENTS

| | | | |
|---|---|---|---|
| 4,037,271 | 7/1977 | Keller | 363/21 |
| 4,156,273 | 5/1979 | Sato | 363/21 |
| 4,459,651 | 7/1984 | Fenter | 363/21 |
| 4,497,017 | 1/1985 | Davis | 363/49 |
| 4,623,960 | 11/1986 | Eng | 363/21 |

Primary Examiner—Peter S. Wong
Attorney, Agent, or Firm—Sughrue, Mion, Zinn, Macpeak & Seas

[57] ABSTRACT

In order to effectively reduce power consumption in a power supply arrangement for use in a dc-to-dc converter, a series circuit consisting of a resistor and a first and second Zener diodes, is provided between two input terminals of the dc-to-dc converter. The series circuit defines two junctions one of which is between the resistor and the first Zener diode and the other of which is between the first and second Zener diodes. A transistor switching controller has two input terminals coupled across the above-mentioned two Zener diodes. A three-terminal voltage regulator has an input coupled to receive power supply from a transformer, an output coupled to the first junction of the series circuit, and a ground terminal coupled to the second junction. A rated input voltage of the three-terminal voltage regulator is essentially raised by connecting the ground terminal to the second junction, whereby an excessive voltage protection circuit with inherent power consumption characteristics can be removed from the input side of the three-terminal voltage regulator.

3 Claims, 2 Drawing Sheets

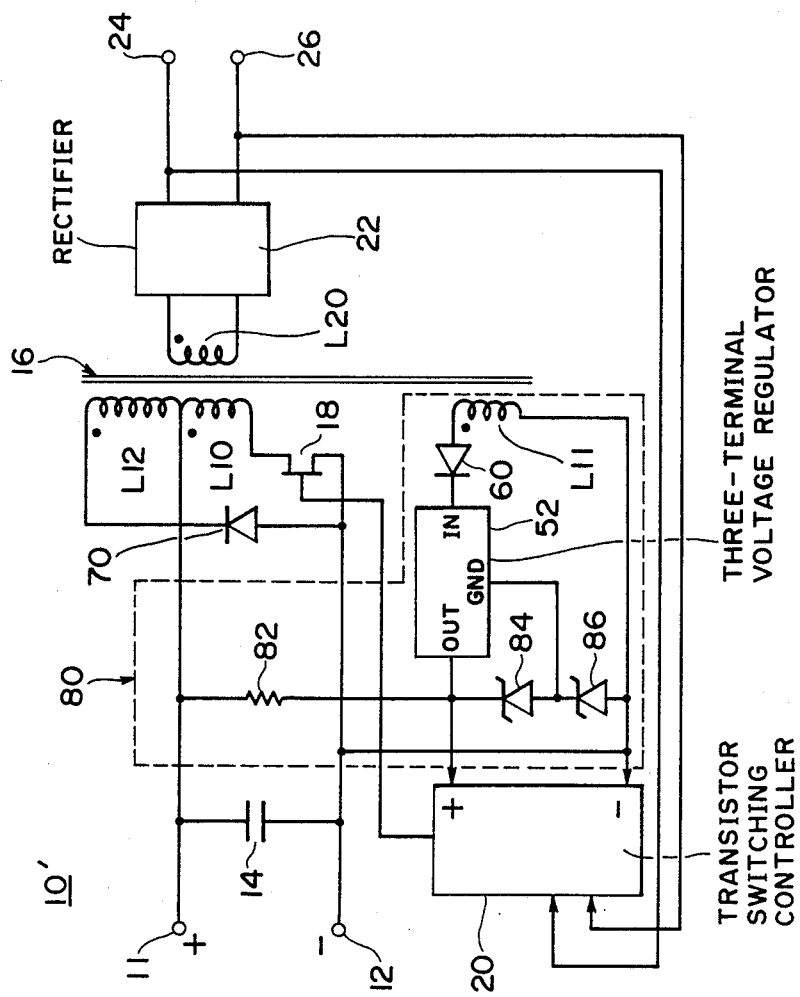

DC-TO-DC CONVERTER HAVING IMPROVED POWER SUPPLY ARRANGEMENT

BACKGROUND OF THE INVENTION

1. Field of the Invention

This invention relates generally to a dc-to-dc converter and more specifically to such a converter which is provided with an improved power supply arrangement by which undesired heat generation in the converter can effectively be reduced.

2. Description of the Prior Art

In order to obtain a stable dc power output without an undesirable increase in the number of electronic components, it is a known practice to implement dc-to-dc conversion of a rectified but unregulated ac line voltage through the use of a dc-to-dc converter. This kind of power supply circuitry is currently employed in a variety of electronic equipments.

Before describing in detail the present invention a known dc-to-dc converter will be discussed with reference to FIG. 1.

Input terminals 11 and 12 of a dc-to-dc converter 10 is supplied with a full-wave rectified ac line voltage (100 V by way of example). A capacitor 14, coupled across the input terminals 11, 12, operates as a capacitor filter. As shown, a transformer 16 is provided with three primary windings L10, L11, L12, and a secondary winding L20. The winding L10 and a switching transistor 18 are coupled in series across the input terminals 11 and 12. The transistor 18 is selectively rendered conductive (viz switched on and off) by a train of pulses applied thereto from a transistor switching controller 20. An ac voltage developed across the secondary winding L20 is rectified at a rectifier 22 whose dc outputs are applied to the transistor switching controller 20 and also applied to output terminals 24, 26 of the dc-to-dc converter 10. The transistor switching controller 20 changes the pulse duration of the output pulse thereof in accordance with the dc output applied to two control inputs thereof from the rectifier 22, thereby controlling the dc output derived at the output terminals 24, 26. The transistor switching controller 20 is known in the art and is prepared by, for example, combining two monolithic ICs such as μPC1093J and μPC1094C manufactured by the NEC Corporation. A diode 70, coupled in series with the primary winding L12 between the input terminals 11 and 12, is provided for releasing electromagnetic energy induced when the transistor 18 opens.

An arrangement 50, enclosed by a dashed line, supplies the transistor switching controller 20 through two dc-power supply inputs with dc power. The power supply arrangement 50 comprises a three-terminal voltage regulator 52, two resistors 54 and 56, a Zener diode 58, a diode 60 and the primary winding L11. More specifically, the resistor 54 and the Zener diode 58 are connected in series between the input terminals 11, 12. On the other hand, a series circuit, consisting of the resistor 56, the diode 60 and the winding L11, is connected across the Zener diode 58. The three-terminal voltage regulator 52 has its input terminal "IN" coupled to a junction 55 between the components 54, 56 and 58, and its output terminal "OUT" coupled to the "+" input of the controller 20. The ground terminal "GND" of the voltage regulator is coupled to the "−" input terminal of the dc-to-dc converter 10. Merely by way of example, the three-terminal voltage regulator 52 may comprise a μPC7805H IC chip which is manufactured by the NEC Corporation.

When the dc-to-dc converter 10 is first put into operation, the pulse duration of each pulse outputted from the controller 20 is very narrow and increases to the desired width over a finite period of time. Therefore, during the initial period of operation of the dc-to-dc converter 10, dc power required by the controller 20 is relatively small and can be readily supplied to the controller 20 through the resistor 54 and the three-terminal voltage regulator 52. However, as the pulse duration of each of the pulses from the controller 20 becomes longer and the dc output of the converter 10 increases, the dc power supply through the resistor 54 encounters a limit. In such a case, additional dc power is supplied to the three-terminal voltage regulator 52 through the winding L11, the diode 60 and the resistor 56. The resistor 56 and the Zener diode 58 prevent an excessive voltage from being applied to the three-terminal voltage regulator 52.

As mentioned previously, in order to obtain a stable dc output power without substantially increasing the number of electronic components, a rectified ac line voltage (100 V for example) is applied to such a dc-to-dc converter as shown in FIG. 1. For the convenience of description it is assumed that (a) the input voltage of the transistor switching controller 20 should be maintained 15 V and (b) the rated input voltage of the three-terminal regulator 52 is 35 V and (c) the output voltage of the regulator 52 should be maintained at 15 V. It is further assumed that the maximum allowable input voltage to the input terminals 11 and 12 is the instantaneous value (about 140 V) of the ac line voltage plus several tens of volts. Therefore, in order that the three-terminal voltage regulator 52 is not rendered inoperative due to the input of a voltage exceeding the maximum allowable value, the breakdown voltage of the Zener diode 58 is set to about 30 V. The parameters of the resistors 54, 56 and the ac voltage across the winding L11, should carefully be determined to minimize power consumption at the resistors 54, 56 and at the Zener diode 58 while retaining the power supply of 15 V to the input of the controller 20. However, this prior art has encountered the problem that even the careful adjustment of the parameters of the components are unable to eliminate an undesired amount of power consumption and generation of heat at the resistor 56 and the Zener diode 58.

SUMMARY OF THE INVENTION

It is an object of this invention to provide a dc-to-dc converter which has an improved power supply arrangement by which stable dc power is applied to a transistor switching controller with power consumption minimized.

Another object of this invention is to provide a dc-to-dc converter including an improved power supply arrangement in which power consuming components are effectively removed.

In order to fulfil the object, viz, in order to effectively reduce power consumption in a power supply arrangement for use in a dc-to-dc converter, a series circuit consisting of a resistor and a first and second Zener diodes, is provided between two input terminals of the dc-to-dc converter. The series circuit defines two junctions one of which is between the resistor and the first Zener diode and the other of which is between the first and second Zener diodes. A transistor switching controller has two input terminals coupled across the above-mentioned two Zener diodes. A three-terminal voltage regulator has an input coupled to receive power supply from a transformer, an output coupled to the first junction of the series circuit, and a ground terminal coupled to the second junction. A rated input voltage of the three-terminal voltage regulator is essentially raised by connecting the ground terminal to the second junction, whereby an excessive voltage protection circuit with inherent power consumption characteristics can be removed from the input side of the three-terminal voltage regulator.

One aspect of this invention takes the form of a dc-to-dc converter, which comprises: a series circuit, the series circuit being connected between first and second input terminals of the dc-to-dc converter and defined by a resistor and first and second constant voltage diodes, the series circuit including first and second junctions, the first junction being defined between the first and second constant voltage diodes and the second junction being defined between the first constant voltage diode and the resistor; a transistor switching controller, the transistor switching controller having first and second terminals, the first and second terminals being coupled across the first and second constant voltage diodes; a transformer; and a three terminal voltage regulator, the three terminal voltage regulator having an input coupled to a coil of the transformer, a ground terminal coupled to the first junction and an output terminal coupled to the second junction.

Another aspect of this invention takes the form of a dc-to-dc converter having first and second inputs, the dc-to-dc converter comprising: a transistor switching controller, the transistor switching controller having first and second inputs; a three terminal voltage regulator, the three terminal voltage regulator having an input terminal, a ground terminal and an output terminal, the input terminal being connected to a winding of a transformer of the dc-dc converter; a first and second constant voltage diodes, the first and second constant voltage diodes being connected in series across the first and second inputs of the transistor switching controller, the first and second constant voltages diodes being arranged so that the ground terminal of the three terminal voltage regulator is connected to a node defined therebetween; and a resistor, the resistor being connected between the first input of the dc-to-dc circuit and the first input of the transistor switching controller, the second input terminal of the transistor switching controller being connected to the second input of the dc-to-dc converter.

Still another aspect of this invention takes the form of a dc-to-dc converter including, a switching transistor, a transistor switching controller for controlling the transistor switching by varying the duty cycle thereof, and a transformer having a first and second primary windings, the first primary winding being coupled in series with the transistor switching, the dc-to-dc converter comprising: a first constant voltage diode; a second constant voltage diode coupled in series with the first constant voltage diode, the first and second constant voltage diodes forming a first series circuit which is coupled across the two inputs of the transistor switching controller; a resistor coupled in series with the first series circuit, the resistor and the first series circuit forming a second series circuit which is coupled across the two input terminals of the dc-to-dc converter; and a three-terminal voltage regulator having an input terminal, an output terminal and a ground terminal, the input terminal being coupled to the second primary winding via a diode, the ground terminal being coupled to a junction between the first and second constant voltage diodes, and the output terminal being coupled to

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 2 is a block diagram showing a preferred embodiment according to this invention.

DETAILED DESCRIPTION OF THE PREFERRED EMBODIMENTS

Figure 1:
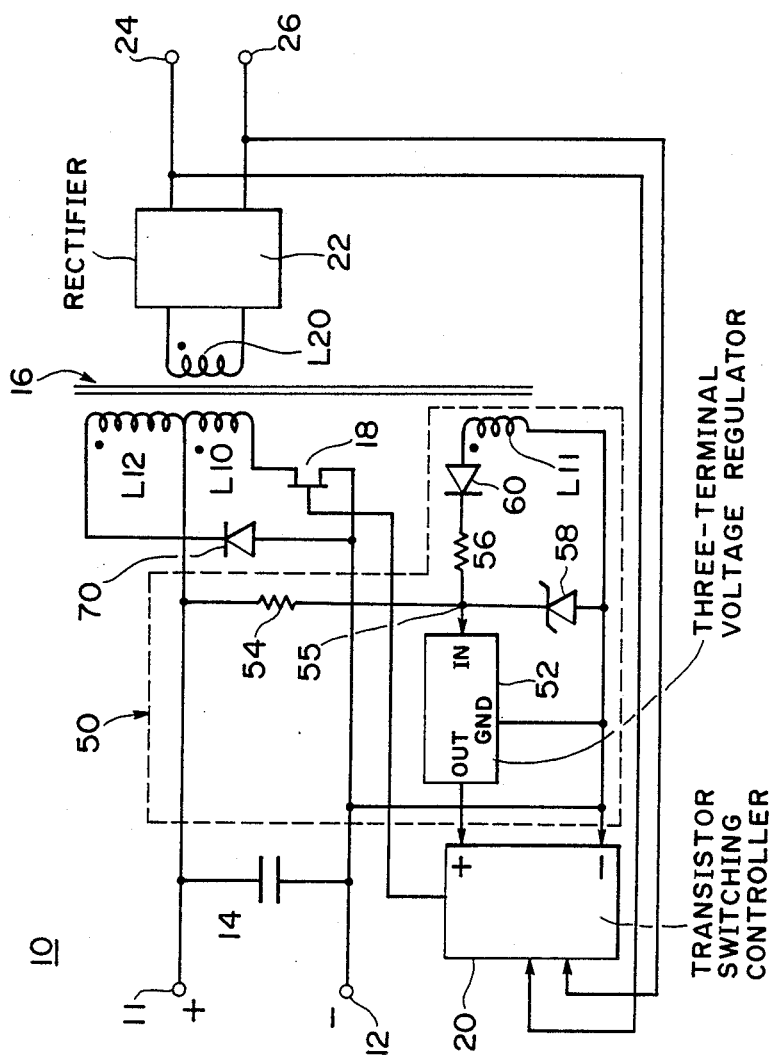
FIG. 1 is a block diagram showing a known dc-to-dc converter.

The embodiment of this invention will be discussed with reference to FIG. 2. This invention is characterized in that the power consuming components 56 and 58 (FIG. 1) have effectively been removed from a dc-to-dc converter 10' shown in FIG. 2.

The circuit of FIG. 2 is identical with that of FIG. 1 except for a power supply arrangement 80. Accordingly, the remaining portions of FIG. 2 will not be referred to for simplicity. The arrangement 80 is in effect the counterpart of the arrangement 50.

As shown in FIG. 2, the arrangement 80, provided for supplying a stable dc power to the transistor switching controller 20, comprises: a resistor 82; two Zener diodes 84, 86 coupled in series across the two inputs of the controller 20; the three-terminal voltage regulator 52; the diode 60 and the primary winding L11. It should be noted that the components 52, 60 and L11 have been employed in the arrangement 50 of FIG. 1.

The operation of the arrangement 80 will be described under essentially the same assumption used in connection with the prior art shown in FIG. 1. That is to say, it is assumed that (a) the input voltage of the transistor switching controller 20 should be maintained 15 V, (b) the rated input voltage of the three-terminal regulator 52 is 35 V, (c) the breakdown voltage of each of the Zener diodes 84, 86 is 7.5 V and (d) the maximum allowable input voltage to the input terminals 11 and 12 is the instantaneous voltage (about 140 V) of the ac line voltage plus several tens of volts.

When the dc-to-dc converter 10' is initially operated, the pulse duration of each pulse outputted from the controller 20 is very narrow. As a consequence, during the initial period of operation, the dc power required by the controller 20 is not large and it is sufficient to directly supply dc power to the controller 20 through the resistor 82. The Zener diodes 84 and 86 coupled in series, prevent an excessive voltage from being applied to the controller 20. On the other hand, as the dc output from the output terminals 24, 26 increases, the pulse duration of each of the pulses from the controller 20 becomes longer. This means that the transistor switching controller 20 requires considerably more power than that required during the initial period of operation. Therefore, the three-terminal voltage regulator 52 is supplied with power through the diode 60. As shown, the ground terminal of the three-terminal voltage controller 52 is coupled via the Zener diode 86 to the negative input terminal " — ". It is therefore understood that the rated input voltage 35 V of the voltage regulator 52 is essentially raised to 42.5 V (35 V+7.5 V). This means that the excessive voltage protection means such as the resistor 56 and the Zener diode 58 is no longer required in this invention, resulting in a more efficient operation of the dc-to-dc converter.

While the foregoing description describes only one embodiment of the present invention, the various alternatives and modifications possible without departing from the scope of the present invention, which is limited only by the appended claims, will be apparent to those skilled in the art.

What is claimed is:

1. In a dc-to-dc converter
    a series circuit, said series circuit being connected between first and second input terminals of said dc-to-dc converter and defined by a resistor and first and second constant voltage diodes, said series circuit including first and second junctions, said first junction being defined between said first and second constant voltage diodes and said second junction being defined between said first constant voltage diode and said resistor;
    a transistor switching controller, said transistor switching controller having first and second terminals, said first and second terminals being coupled across said first and second constant voltage diodes;
    a transformer; and
    a three terminal voltage regulator, said three terminal voltage regulator having an input coupled to a coil of said transformer, a ground terminal coupled to said first junction and an output terminal coupled to said second junction.

2. In a dc-to-dc converter having first and second inputs
    a transistor switching controller, said transistor switching controller having first and second inputs;
    a three terminal voltage regulator, said three terminal voltage regulator having an input terminal, a ground terminal and an output terminal, said input terminal being connected to a winding of a transformer of said dc-dc converter; first and second constant voltage diodes, said first and second constant voltage diodes being connected in series across said first and second inputs of said transistor switching controller, said first and second constant voltages diodes being arranged so that the ground terminal of said three terminal voltage regulator is connected to a node defined therebetween; and
    a resistor, said resistor being connected between said first input of said dc-to-dc circuit and the first input of said transistor switching controller, the second input of said transistor switching controller being connected to the second input of said dc-to-dc converter.

3. A dc-to-dc converter having two input terminals including, a switching transistor, a transistor switching controller for controlling said switching transistor by varying the duty cycle thereof, and a transformer having first and second primary windings, said first primary winding being coupled in series with said switching transistor, said transistor switching controller having first and second dc-power supply inputs,
    said dc-to-dc converter comprising:
    a first constant voltage diode;
    a second constant voltage diode coupled in series with said first constant voltage diode, said first and second constant voltage diodes forming a first series circuit which is coupled across the first and second dc-power supply inputs of said transistor switching controller;
    a resistor coupled in series with said first series circuit, said resistor and said first series circuit forming a second series circuit which is coupled across the two input terminals of said dc-to-dc converter; and
    a three-terminal voltage regulator having an input terminal, an output terminal and a ground terminal, said input terminal being coupled to said second primary winding via a diode, said ground terminal being coupled to a junction between said first and second constant voltage diodes, and said output terminal being coupled to said first dc-power supply input.

* * * * *